United States Patent
Kurematsu et al.

(10) Patent No.: US 9,506,537 B2
(45) Date of Patent: Nov. 29, 2016

(54) CHAIN TRANSMISSION

(71) Applicant: TSUBAKIMOTO CHAIN CO., Osaka-shi, Osaka (JP)

(72) Inventors: Yuji Kurematsu, Osaka (JP); Masanori Yokoyama, Osaka (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 78 days.

(21) Appl. No.: 14/252,979

(22) Filed: Apr. 15, 2014

(65) Prior Publication Data

US 2014/0323255 A1    Oct. 30, 2014

(30) Foreign Application Priority Data

Apr. 26, 2013  (JP) ................................ 2013-094435

(51) Int. Cl.
*F16H 7/18* (2006.01)
*F16H 7/06* (2006.01)
*F16G 13/06* (2006.01)

(52) U.S. Cl.
CPC ................ *F16H 7/18* (2013.01); *F16G 13/06* (2013.01); *F16H 7/06* (2013.01); *F16H 2007/185* (2013.01)

(58) Field of Classification Search
CPC .......................... F16G 13/06; F16H 2007/185
USPC ................... 474/111, 140, 230, 231
See application file for complete search history.

(56) References Cited

U.S. PATENT DOCUMENTS

| | | | | |
|---|---|---|---|---|
| 3,709,054 A * | 1/1973 | Montano | ................. | F16G 13/06 474/220 |
| 3,847,031 A * | 11/1974 | Araya | ..................... | F16G 13/06 474/207 |
| 6,220,981 B1 * | 4/2001 | Yoshida | ................. | F16G 13/06 474/111 |
| 7,963,872 B2 * | 6/2011 | Tohara | .................... | F16G 13/08 474/157 |
| 8,088,029 B2 * | 1/2012 | Tohara | .................... | F16H 57/05 474/111 |
| 2007/0082776 A1 | 4/2007 | Nagao | | |
| 2007/0254759 A1* | 11/2007 | Tamiya | .................. | F16M 13/08 474/230 |
| 2008/0076613 A1* | 3/2008 | Nakagawa | ............. | F16G 13/06 474/231 |
| 2010/0093475 A1* | 4/2010 | Miyazawa | ............. | F16G 13/06 474/231 |
| 2010/0267504 A1* | 10/2010 | Miyazawa | ............. | F16G 13/02 474/140 |
| 2012/0316020 A1* | 12/2012 | Miyazawa | ............. | F16G 13/06 474/230 |
| 2013/0053194 A1* | 2/2013 | Yokoyama | ............... | F16H 7/06 474/91 |

FOREIGN PATENT DOCUMENTS

JP        2007-107583 A    4/2007

* cited by examiner

*Primary Examiner* — Minh Truong
(74) *Attorney, Agent, or Firm* — Westerman, Hattori, Daniels & Adrian, LLP

(57) ABSTRACT

A chain transmission is provided which is capable of reducing friction loss in the transmission of power without the risk of compromising the durability of a chain guide mechanism and the chain. The chain transmission includes a chain and a chain guide mechanism. The chain guide mechanism includes a first guide and a second guide having a smaller radius of curvature than that of the first guide. The plurality of plates include a first plate and a second plate. The first plate has a backside height set such that the first plate does not contact the first guide when the first plate is guided by the first guide and such that the first plate contacts the second guide when the first plate is guided by the second guide.

3 Claims, 4 Drawing Sheets

CHAIN TRANSMISSION

BACKGROUND OF THE INVENTION

1. Field of the Invention

The present invention relates to a chain transmission including a chain having a plurality of plates and a chain guide mechanism that guides the chain in sliding contact therewith.

2. Description of the Related Art

Conventionally known timing chain systems for car engines (see, for example, Japanese Patent Application Laid-open No. 2007-107583) include, for example, a chain transmission including a chain having a plurality of plates and a chain guide mechanism.

This known timing chain system is made up of sprockets mounted to a crankshaft and a camshaft inside an engine room, a chain passing over the sprockets, a fixed guide fixed to the engine block for guiding the chain, a pivot guide pivotally attached to the engine block for guiding the chain, and a tensioner that presses the pivot guide to give an appropriate tension to the chain.

In the chain described in Japanese Patent Application Laid-open No. 2007-107583, in order to reduce the contact area between the chain and the pivot/fixed guides to reduce the friction loss in the transmission of power, outer plates have a smaller backside height than inner plates so that only the inner plates contact the pivot guide and fixed guide when the chain runs, i.e., the number of plates that contact the pivot/fixed guides is reduced.

With a fewer number of plates in contact with the pivot/fixed guides as in the chain described in Japanese Patent Application Laid-open No. 2007-107583, slide resistance of the running chain is reduced because the contact area between the chain and the pivot/fixed guides is reduced. On the other hand, the contact pressure per area is increased. There was thus a problem in that, in some areas of contact between the guides and plates, where the radius of curvature of the guides is small, the contact pressure therebetween could become excessive, and this results in a reduction in durability of the guides and plates.

SUMMARY OF THE INVENTION

The present invention solves these problems and has as its object the provision of a chain transmission with reduced friction loss in the transmission of power without the risk of compromising the durability of the chain guide mechanism and the chain.

To achieve the above object, the present invention provides a chain transmission including a chain having a plurality of plates and a chain guide mechanism that guides the chain in sliding contact therewith, the chain guide mechanism including a first guide and a second guide having a smaller radius of curvature than that of the first guide, the plurality of plates including a first plate and a second plate, the first plate having a backside height set such that the first plate does not contact the first guide when the first plate is guided by the first guide and such that the first plate contacts the second guide when the first plate is guided by the second guide, when the backside height is defined as a dimension in a normal direction of a pitch line of the chain from the pitch line to an outermost end face of a plate facing the chain guide mechanism.

According to an aspect of the present invention, the plurality of plates forming the chain include a first plate that has a backside height set such that it does not contact the first guide when the first plate is guided by the first guide and such that the first plate contacts the second guide when the first plate is guided by the second guide, so that, when the chain is guided by the first guide that has a large radius of curvature and has a reduced degree of contact with the chain, the number of plates in contact with the chain is reduced to reduce friction loss, while, when the chain is guided by the second guide that has a small radius of curvature and has a greater degree of contact with the chain, the number of plates in contact with the chain is increased to reduce the contact pressure per area, whereby the risk of compromising the durability of the chain guide mechanism or the chain is avoided. Thus the friction loss in the transmission of power is reduced without the risk of compromising the durability of the chain guide mechanism or the chain.

According to another aspect of the present invention, the plurality of plates forming the chain include a second plate that has a backside height set such that the second plate contacts the first guide when the second plate is guided by the first guide and such that the second plate contacts the second guide when the second plate is guided by the second guide, so that the chain can run stably, as the second plate contacts both of the first guide and the second guide.

According to another aspect of the present invention, the plurality of plates include a plate with a rounded convex end face on a side facing the chain guide mechanism and a plate with a flat end face on the side facing the chain guide mechanism, so that adjustments can be made in accordance with the radii of curvature of the guides, chain speed, and the like by combining and suitably arranging these plates with a small and large contact area with the guides, whereby the durability of the chain guide mechanism and the chain can be maintained and the friction loss can be reduced.

According to another aspect of the present invention, the plurality of first plates are arranged side by side in the width direction of the chain, so that a good balance is kept between the left and right side in the chain width direction of the chain and the guides making contact with each other, whereby stable movement of the chain is ensured.

According to another aspect of the present invention, the plurality of plates forming the chain include a third plate that has a backside height set such that the third plate does not contact the first guide when the third plate is guided by the first guide and such that the third plate does not contact the second guide when the third plate is guided by the second guide, so that the contact area between the chain and the guides is reduced, which in turn reduces the friction loss in the transmission of power.

According to another aspect of the present invention, the third plate is fixed to a connecting pin. As the plate is fixed to the connecting pin, the plate can have a pin hole with a small diameter, as the plate does not need to hold the connecting pin rotatably, and accordingly the plate can have a smaller backside height. With such a third plate having a smaller backside height fixed to the connecting pin, the chain can be made smaller in the chain height direction.

DESCRIPTION OF THE PREFERRED EMBODIMENTS

The present invention provides a chain transmission including a chain having a plurality of plates and a chain guide mechanism that guides the chain in sliding contact therewith, and it may be embodied in any specific form as long as the chain guide mechanism includes a first guide and a second guide having a smaller radius of curvature than that of the first guide, the plurality of plates including a first plate and a second plate, the first plate having a backside height set such that the first plate does not contact the first guide when it is guided by the first guide and such that the first plate contacts the second guide when it is guided by the second guide, wherein the backside height is defined as a dimension in a normal direction of a pitch line of the chain from the pitch line to an outermost end face of a plate facing the chain guide mechanism, so that the friction loss in the transmission of power can be reduced without the risk of compromising the durability of the chain guide mechanism or the chain.

The chain may be any type of chain if it has a plurality of plates, such as, for example, a roller chain, bushing chain, silent chain, and the like.

While the chain described in the following embodiment has three types of plates with different backside heights set in accordance with the radius of curvature of guides, the chain according to the present invention may have two or more types of plates. A fourth plate, for example, that has a different backside height, may also be used in addition to the first to third plates.

Specific positions and arrangement of various plates that form the chain may be determined suitably in accordance with the radius of curvatures of respective guides and speeds or the like at which the chain will be running.

While the first guide and the second guide described in the following embodiment having different radii of curvature are formed on different components (pivot guide and fixed guide), the first guide and the second guide may be formed on the same component.

While the chain guide mechanism described in the following embodiment has two types of guides having different radii of curvature, the mechanism may include three or more types of guides with different radii of curvature.

While the chain transmission described in the following embodiment is designed as a timing chain system, it may be embodied in any other specific form as long as it includes a chain and a chain guide mechanism.

Embodiment

A chain transmission 100 according to one embodiment of the present invention will be hereinafter described with reference to the drawings.

Figure 1:
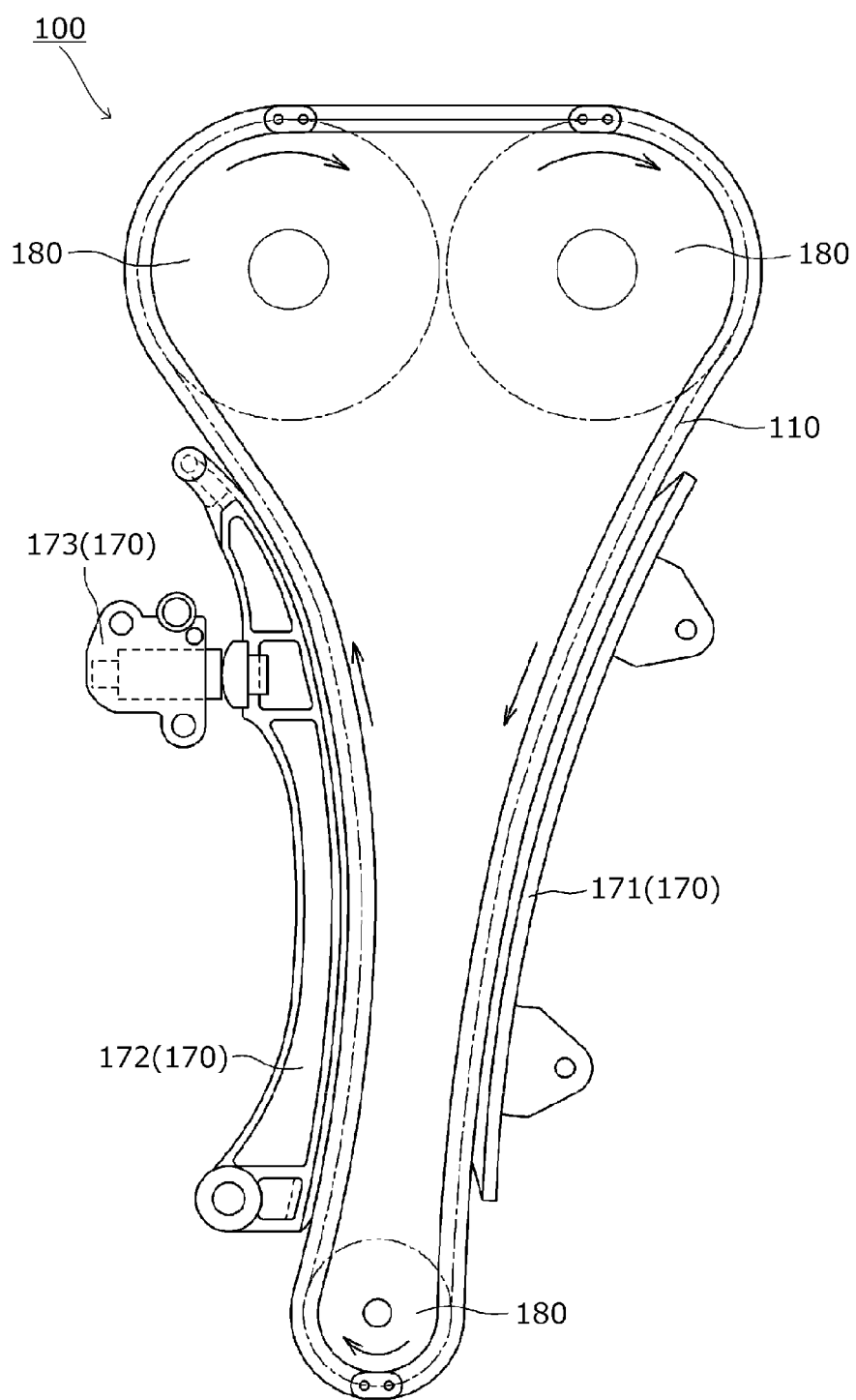
FIG. 1 is a diagram illustrating a chain transmission according to one embodiment of the present invention.

The chain transmission 100 is designed as a timing chain system of a car engine, and includes, as shown in FIG. 1, sprockets 180 mounted to a crankshaft and a camshaft inside an engine room, a chain 110 passing over the sprockets 180, and a chain guide mechanism 170 that guides the chain 110 in sliding contact therewith.

The chain guide mechanism 170 is formed by a fixed guide 171 fixed to the engine block for guiding the chain 110, a pivot guide 172 pivotally attached to the engine block for guiding the chain 110, and a tensioner 173 that presses the pivot guide 172 to give an appropriate tension to the chain 110, as shown in FIG. 1.

Figure 3:
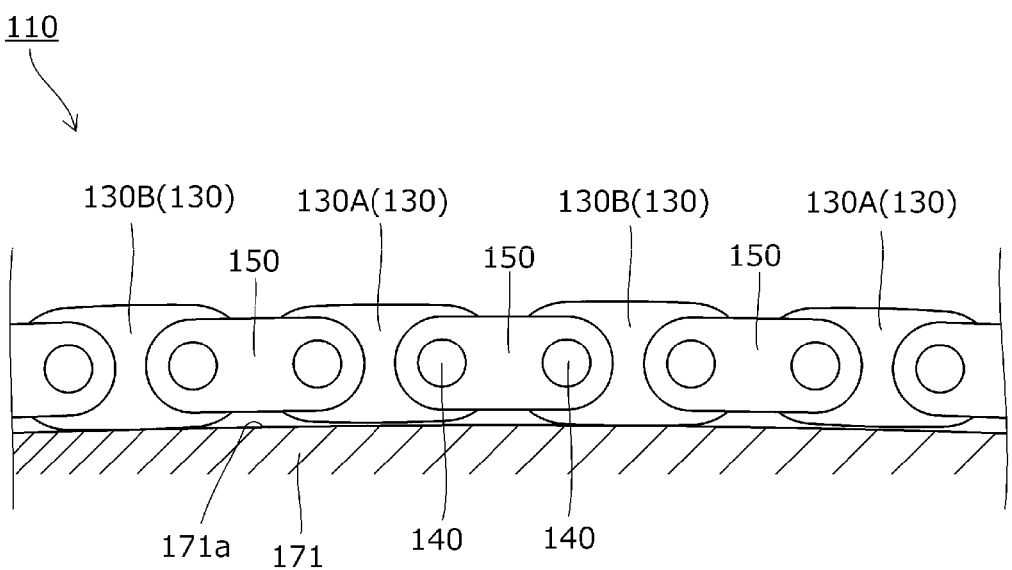
FIG. 3 is a diagram illustrating the chain guided by a first guide with a large radius of curvature.
Figure 4:
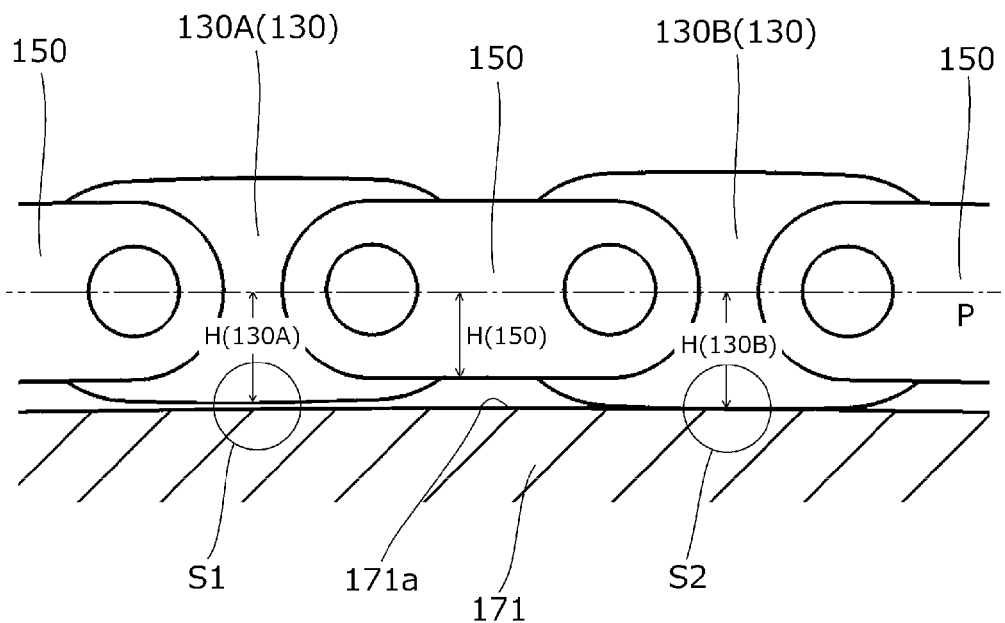
FIG. 4 is a diagram illustrating part of FIG. 3 to a larger scale.
Figure 5:
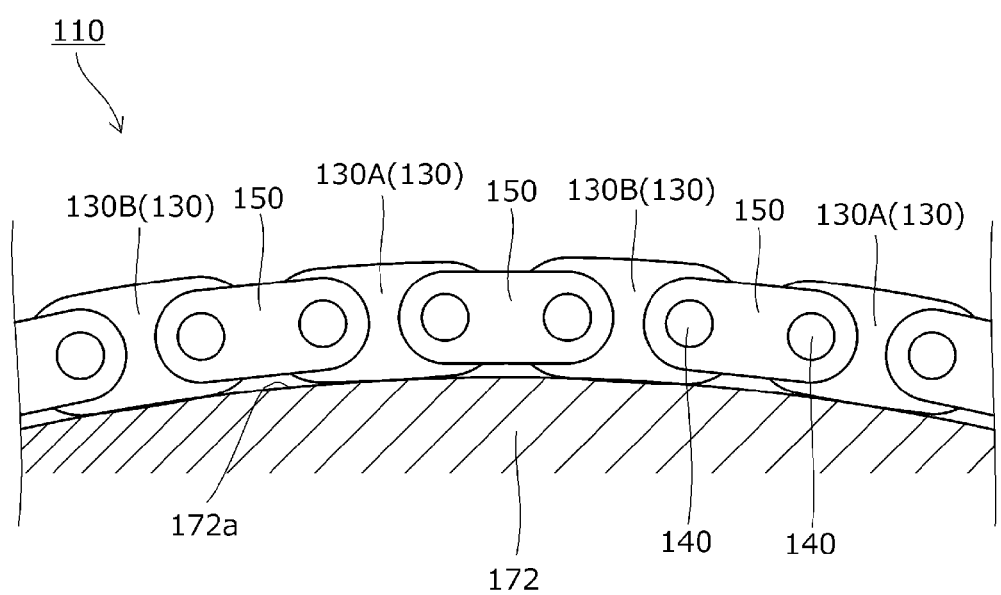
FIG. 5 is a diagram illustrating the chain guided by a second guide with a small radius of curvature.
Figure 6:
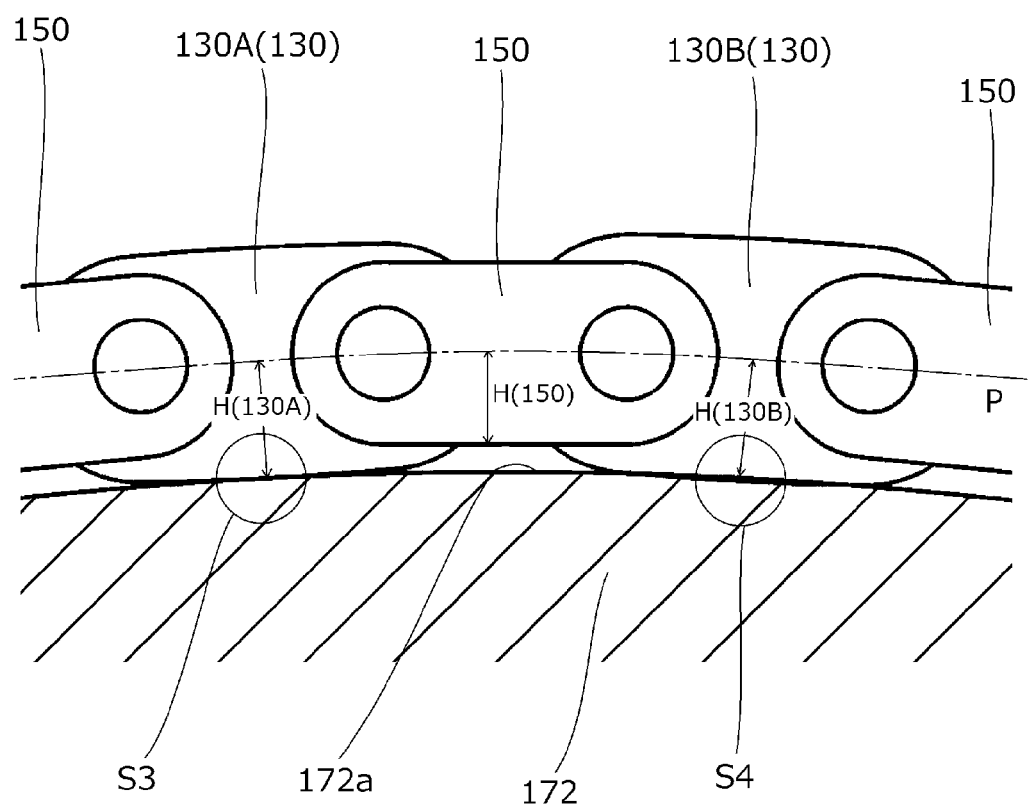
FIG. 6 is a diagram illustrating part of FIG. 5 to a larger scale.

The fixed guide 171 has a first guide 171a formed as a shoe surface for guiding the chain 110 in sliding contact therewith as shown in FIG. 3 or FIG. 4. The pivot guide 172 has a second guide 172a formed as a shoe surface for guiding the chain 110 in sliding contact therewith as shown in FIG. 5 or FIG. 6. The radius of curvature of the second guide 172a is set smaller than the radius of curvature of the first guide 171a. In this embodiment, the radius of curvature is 150 mm or less.

Figure 2:
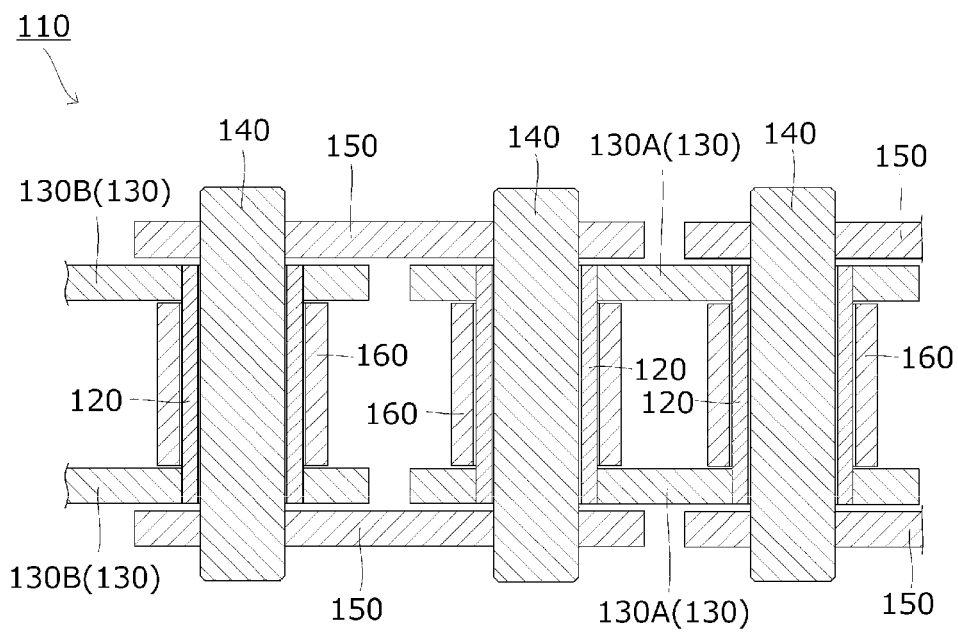
FIG. 2 is a cross-sectional view illustrating a chain that forms the chain transmission.

The chain 110 is formed as a so-called roller chain and includes, as shown in FIG. 2, a plurality of inner links each having a pair of left and right inner plates 130 with bushing holes for fixedly holding both ends of a pair of front and rear bushings 120, a plurality of outer links each having a pair of left and right outer plates 150 with pin holes for fixedly holding both ends of a pair of front and rear connecting pins 140, and rollers 160 fitted on the bushings 120. These inner links and outer links are alternately connected to each other along the longitudinal direction of the chain by inserting the connecting pins 140 in the bushings 120.

In this embodiment, for the inner plates 130, two types of plates with different backside heights, a first inner plate 130A and a second inner plate 130B, are used.

Inner links 130 of the same type (either first inner plate 130A or second inner plate 130B) are arranged in parallel, i.e., side by side, in the width direction of the chain, as shown in FIG. 2.

The first inner plates 130A and second inner plates 130B are alternately arranged along the longitudinal direction of the chain, as shown in FIG. 3 or FIG. 5.

The arrangement of the first inner plates 130A and second inner plates 130B in the longitudinal direction of the chain is not limited to the example described above and they may be aligned in any other way. For example, two pairs of first inner plates 130A and one pair of second inner plates 130B may be alternately arranged.

In this embodiment, as shown in FIG. 3 to FIG. 6, end faces of respective plates (first inner plate 130A, second inner plate 130B, and outer plate 150) on the side facing the chain guide mechanism 170 are formed flat.

The shape of the plates forming the chain 110 is not limited to the example described above. The chain 110 may be formed from plates with rounded convex end faces, or the chain 110 may be formed from both of flat plates and plates with rounded convex end faces. The chain 110 should more preferably be formed from both of flat plates and plates with rounded convex end faces, because adjustments can then be made in accordance with the radii of curvature of the guides 171a and 172a, chain speed, and the like, by combining and suitably arranging these plates with a small and large contact area with the guides 171a and 172a, so that the durability of the chain guide mechanism 170 and the chain 110 can be maintained and the friction loss can be reduced further.

Next, the backside height of each plate (first inner plate 130A, second inner plate 130B, and outer plate 150) will be described with reference to FIG. 4 and FIG. 6.

The term "backside height" herein refers to a dimension in the normal direction of a pitch line P of the chain 110 from the pitch line P to an outermost end face of the plate facing the chain guide mechanism 170. A pitch line P of the chain 110 is defined as the line that connects the centers of respective connecting pins 140 (bushings 120) in the longitudinal direction of the chain.

The backside height H (130A) of the first inner plate 130A is set such that the plate does not contact the first guide 171*a* having a large radius of curvature when it is guided by the first guide 171*a* as shown in the part denoted at S1 in FIG. 4, and such that the plate contacts the second guide 172*a* having a small radius of curvature when it is guided by the second guide 172*a* as shown in the part denoted at S3 in FIG. 6.

The backside height H (130B) of the second inner plate 130B is set such that the plate contacts the first guide 171*a* having a large radius of curvature when it is guided by the first guide 171*a* as shown in the part denoted at S2 in FIG. 4, and such that the plate contacts the second guide 172*a* having a small radius of curvature when it is guided by the second guide 172*a* as shown in the part denoted at S4 in FIG. 6.

The backside height H (150) of the outer plate 150 is set such that the plate does not contact the first guide 171*a* having a large radius of curvature when it is guided by the first guide 171*a* as shown in FIG. 4, and such that the plate does not contact the second guide 172*a* having a small radius of curvature when it is guided by the second guide 172*a* as shown in FIG. 6.

In other words, the relationships between the backside heights of respective plates (first inner plate 130A, second inner plate 130B, and outer plate 150) are such that the backside height H (130B) of the second inner plate 130B is larger than the backside height H (130A) of the first inner plate 130A, while the backside height H (130A) of the first inner plate 130A is larger than the backside height H (150) of the outer plate 150.

What is claimed is:

1. A chain transmission comprising a chain having a plurality of plates and a chain guide mechanism that guides the chain in sliding contact therewith,
the chain guide mechanism including a first guide and a second guide having a smaller radius of curvature than that of the first guide,
the plurality of plates including a first plate and a second plate,
the first plate having a backside height set such that the first plate does not contact the first guide when the first plate is guided by the first guide and such that the first plate contacts the second guide when the first plate is guided by the second guide, when the backside height is defined as a dimension in a normal direction of a pitch line of the chain from the pitch line to an outermost end face of a plate facing the chain guide mechanism,
wherein a number of said plurality of plates that contacts the first guide is less than a number of said plurality of plates that contacts the second guide, wherein the second plate has a backside height set such that the second plate contacts the first guide when the second plate is guided by the first guide and such that the second plate contacts the second guide when the second plate is guided by the second guide, and wherein the plurality of plates include a third plate, and the third plate has a backside height set such that the third plate does not contact the first guide when the third plate is guided by the first guide and such that the third plate does not contact the second guide when the third plate is guided by the second guide.

2. The chain transmission according to claim 1, wherein a plurality of first plates are provided, and
the plurality of first plates are arranged side by side in a width direction of the chain.

3. The chain transmission according to claim 1, wherein the chain includes a connecting pin that connects one with another of the plates, and
the third plate is fixed to the connecting pin.

* * * * *